April 10, 1945.   A. J. LOEPSINGER   2,373,125
SPRING SUPPORT
Filed Sept. 30, 1943
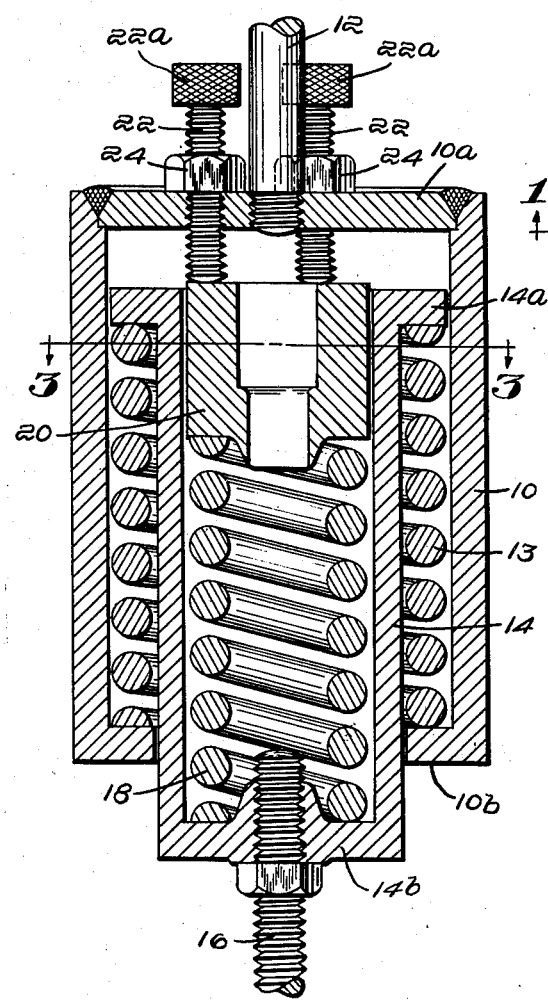
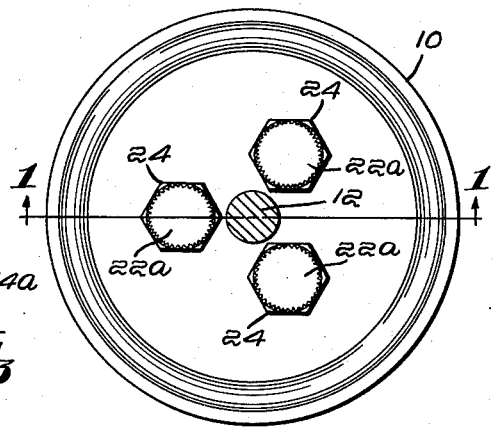
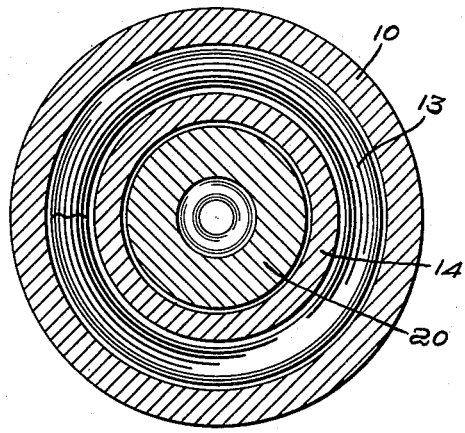
Albert J. Loepsinger,
Inventor:
by Harry Dexter Peck
Attorney Patented Apr. 10, 1945

2,373,125

UNITED STATES PATENT OFFICE 2,373,125

SPRING SUPPORT

Albert J. Loepsinger, Providence, R. I., assignor to Grinnell Corporation, Providence, R. I., a corporation of Delaware Application September 30, 1943, Serial No. 504,506

3 Claims. (Cl. 248—59)

This invention relates to improvements in spring supports. More especially it has to do with the provision of vibration dampening means in such a support and so arranged as not to disturb the desired flexibility of the load spring.

Spring supports are employed where it is contemplated that the load to be supported will be subject to a range of movement which can be foretold with reasonable certainty. For example, if the spring support is to be used to support a pipe of a system through which usually flows a fluid at high temperature, it can be determined rather closely how much any pipe will move upward from its position when empty or cold to the position the pipe occupies when the fluid is hot. For such a predetermined movement, it is desirable to employ a spring whose lifting force will substantially equal the weight of the load when the fluid it hot, that is when the pipe is in its usual or normally high position. As the pipe moves from this upper position to a lower one the spring is compressed or elongated, depending upon the kind of spring used, and exerts a greater lifting force than the load weight. This necessarily imposes a stress on the system which is not desirable. Accordingly the spring chosen for such a pipe is one having a favorable degree of flexibility to permit the spring to be deflected with as little change in its lifting force as possible, and thus minimize the undesired stress on the system.

Such a loaded spring has a certain frequency and if the pipe supported should become subject to a vibratory influence having the same frequency the extended vibrations which grow out of such a synchronous situation might cause serious injury to the piping system. It is therefore important to provide means for dampening the vibrations and thus restrict the movement of the pipe, due to vibratory influences, to a limited extent.

It is an object of my invention to provide a simple spring hanger which will have the desired flexibility when the pipe moves downward from its normally high position and yet have its vibrations restricted when it tends to move above that position. It is also a feature of my improvements to provide simple and easily accessible means for adjusting the dampening means rather nicely.

The best mode in which I have contemplated applying the principles of my invention is shown in the accompanying drawing but these are to be taken as merely illustrative for it is intended that the patent shall cover by suitable expression in the appended claims whatever features of patentable novelty exist in the invention disclosed.

In the drawing:

Figure 1 is a vertical medial section, as on line 1—1 of Figure 2, of a spring support embodying my invention;

Figure 2 is a plan view; and

Figure 3 is a section on line 3—3 of Figure 1.

Referring to the drawing the support shown for illustrative purposes has a casing 10 whose top 10a is secured to some sort of tie element 12 which is connected to a suitable support, not shown. An inturned marginal flange 10b at the bottom of the casing serves as a seat for what I shall term a load spring 13. The top of this spring engages an outturned flange 14a of a hollow cylindrical element 14 which extends downward inside the load spring and through the opening at the bottom of the casing. The bottom 14b of this cylindrical element has secured to it a tie rod 16 that is connected in some suitable manner to the load to be supported.

Inside the cylindrical element I provide a resilient element here shown in the form of an auxiliary spring 18 which can be of any strength desired but which I prefer to have rather strong, since its sole function is to resist only the upward displacement of the load beyond its normal or predetermined high or hot position. The latter is the position of the parts shown on Figure 1, when the pipe being supported is at its highest point of movement caused by the thermal influence on the system. When so positioned the auxiliary spring 18 is fully extended and merely supporting a cylindrical spacer block 20, the weight of which for all practical purposes can be neglected. Set screws 22, preferably three in number, which have knurled heads 22a for hand adjustment, and lock nuts 24 to secure them in adjusted positions, can be screwed downward through the casing top 10a until they just touch the top surface of the spacer block, when the latter is resting on the undeflected spring 18.

If the system cools down and the supported pipe descends to a position lower than its normal one, the load spring 13 is compressed. But the auxiliary spring 18 and the block 20 simply move downward with the cylindrical element 14, the block separating from the adjusting screws 22. Since in this anticipated movement of the pipe there is no additional load imposed on the spring 13, the flexibility of the latter is not disturbed.

If, however, when the load is in its normal or predetermined position, shown in Figure 1 and is subjected to a vibratory influence which will tend to make the load move upward and downward, it is desirable to counteract this tendency at all times and especially so if the frequency of the vibratory influence should happen to be the same as the frequency of the loaded spring 13. When the load starts upward, the auxiliary spring 18 then becomes effective to resist such movement, since the block 20 will be prevented from moving upward by the set screws 22.

While the auxiliary spring is thus active to resist the upward movement, the load in effect is being supported by the two springs, albeit one is acting in a negative manner. This at once changes the frequency of the support from that of the loaded spring alone to that of the two springs acting in parallel, even though they act with opposite supporting effects. As a result any otherwise synchronous relation between the frequency of the vibratory influence and that of the loaded spring is completely upset during the upward movement of the pipe beyond its normal position. The vibrations are thus dampened and the movements of the pipe due thereto are held within safe limits.

Although the appended drawing shows a spring support in the form of a hanger with the load below, it is to be understood that the casing 10 could be supported from below, the tie 12 omitted and the rod 16 be passed down through a hole in the cover 10a and thence through the block 20 to be secured to the base 14b of the cylindrical element. In such an arrangement the load would be carried above the support.

I claim:

1. A spring support comprising a casing connected to a support and having at its bottom an opening surrounded by a seat for a load spring; a load spring resting on said seat; an element having at its upper end an outstanding flange resting on said load spring and having a hollow body movable through said bottom opening of the casing and connected to the load; auxiliary resilient means engaging said element; an adjustable stop extending through the top of said casing for said auxiliary means; and means outside the casing for adjusting said stop; the said load spring acting alone on said load when the latter is in its normal position and in any position therebelow, and the said stop being adjusted to cause the auxiliary means to act on said load to resist movement of the load only when the load moves above its normal position.

2. A spring support having a casing connected with a support; an element connected to and movable with a load; a load spring interposed between the casing and the element and adapted to support the load in its normal position; an auxiliary spring arranged to act on the element and oppose movement of the load above its normal position; a spacer block floating on the top of said auxiliary spring; and means adjustable from outside said casing for determining the point at which upward movement of the floating block is limited to thereby cause the said opposition of the auxiliary spring to become effective.

3. A spring support comprising a load spring arranged to support a load in a normal position and to permit movement of the load above and below the said position; an auxiliary spring arranged to oppose movement of said load only above said position; a movable element floating on the top of said auxiliary spring; and adjustable means comprising a set screw extending through said casing in the path of movement of said floating element for limiting the movement of said element in an upward direction to thereby effect the opposing action of the auxiliary spring.

ALBERT J. LOEPSINGER.